US012683048B2

(12) United States Patent (10) Patent No.: US 12,683,048 B2
Rado et al. (45) Date of Patent: Jul. 14, 2026

(54) METHOD FOR MANUFACTURING A MAGNET FROM RECYCLED MAGNETS

(71) Applicant: Orano PROJECTS, Châtillon (FR)

(72) Inventors: Cyril Rado, Grenoble (FR); Sorana Luca, Grenoble (FR)

(73) Assignee: ORANO PROJETS, Châtillon (FR)

( * ) Notice: Subject to any disclaimer, the term of this patent is extended or adjusted under 35 U.S.C. 154(b) by 505 days.

(21) Appl. No.: 18/185,132

(22) Filed: Mar. 16, 2023

(65) Prior Publication Data

US 2023/0317329 A1 Oct. 5, 2023

(30) Foreign Application Priority Data

Mar. 16, 2022 (FR) ..................................... 22/02305

(51) Int. Cl.
| | |
|---|---|
| *H01F 41/02* | (2006.01) |
| *B09B 3/32* | (2022.01) |
| *B09B 3/40* | (2022.01) |
| *B22F 9/04* | (2006.01) |
| *B22F 9/16* | (2006.01) |
| *H01F 1/057* | (2006.01) |

(52) U.S. Cl.
CPC ............. *H01F 1/0577* (2013.01); *B09B 3/32* (2022.01); *B09B 3/40* (2022.01)

(58) Field of Classification Search
None
See application file for complete search history.

(56) References Cited

U.S. PATENT DOCUMENTS

| | | | |
|---|---|---|---|
| 2004/0020563 A1* | 2/2004 | Tokuhara | .............. H01F 1/0573 |
| | | | 148/105 |
| 2014/0170014 A1* | 6/2014 | Lee | ....................... H01F 1/0573 |
| | | | 75/348 |
| 2014/0366687 A1 | 12/2014 | Zakotnik et al. | |
| 2015/0071810 A1 | 3/2015 | Lv et al. | |

FOREIGN PATENT DOCUMENTS

FR 3044161 A1 5/2017

* cited by examiner

*Primary Examiner* — Xiaowei Su
(74) *Attorney, Agent, or Firm* — Oliff PLC

(57) ABSTRACT

The invention concerns a method for manufacturing a magnet from recycled magnets comprising the following steps of:
providing:
a 1st powder comprising grains of a magnetic phase $TR_2Fe_{14}B$, metal-based compounds and a grain boundary phase rich in rare earth, said 1st powder being free of heavy rare earth,
a 2nd powder obtained from recycled magnets comprising heavy rare earths,
the 2nd powder is subjected to a hydrogenation-disproportionation treatment,
the 1st powder is mixed with the 2nd powder obtained at the end of step b),
the mixture obtained at the end of step c) is subjected to a compacting step so as to obtain a compacted part,
the compacted part obtained at the end of step d) is subjected to a sintering step so as to obtain a magnet.

12 Claims, No Drawings

METHOD FOR MANUFACTURING A MAGNET FROM RECYCLED MAGNETS

The present invention concerns a method for manufacturing a magnet from recycled magnets. More specifically, the invention concerns permanent magnets of the TRFeB type.

In the context of the present invention, «TR» designates an element or a combination of two or more elements selected from the rare earths (in particular the rare earths: La, Ce, Pr, Nd, Dy, Gd, Tb, Ho).

TR is predominantly neodymium (Nd). This is why the most common example of these permanent magnets is the NdFeB type magnet in which the crystalline phase $Nd_2Fe_{14}B$ is the main phase, namely an alloy of neodymium, iron and boron allowing to form a tetragonal crystal system.

Due to their excellent magnetic properties which are good coercivity (namely resistance to demagnetization) and high remanence (namely high magnetic force), NdFeB type permanent magnets are commonly used in various applications among which mention may in particular be made of the magnets of the motors of electric or hybrid vehicles, of electrical appliances (for example household electrical or air conditioning appliances), of electronic appliances (for example hard disks) and of wind turbine generators.

However, given the current problems of environmental protection and the depletion of natural resources, in particular rare earths, in order to satisfy a perpetually growing demand and at the very least able to exceed the supply projections in these permanent magnets for these various advanced technologies, it is necessary to be able to effectively recycle the magnets contained in these various appliances, devices or motors, when these devices are out of use, in order to limit the production of these magnets from only of virgin materials extracted from deposits.

In the context of the present invention, the term «recycled magnets» means:

magnets which have been, with a view to a new use, recovered (for example during waste sorting operations) in appliances, devices, motors or other products containing magnets and which were no longer used, and also magnets corresponding to production scraps, for example scraps from the production of magnets (because in particular defective) and which are thus recycled.

There are different routes of recycling NdFeB type permanent magnets.

A 1st of these routes is the so-called «direct» recycling during which the recovered magnets (for example from unusable appliances) are reused in the state of blocks, possibly after one or more surface treatments and machining. In other words, according to this route, the magnets are produced directly from recycled magnets. There is no compulsory treatment leading to a modification of the physico-chemical properties of the recycled magnets, but simply a light external treatment or cutting for the desired shaping. It is however possible to carry out a rare earth diffusion treatment on these magnets from their surface, which modifies their physico-chemical properties and therefore their magnetic properties, mainly the coercivity.

A 2nd recycling route is a so-called «indirect» or «long» route during which the constituent chemical elements of the recovered magnets (for example from unusable appliances) are separated in the form of oxides, thanks to pyrometallurgy or hydrometallurgy treatments. These oxides thus obtained are reintroduced upstream of the manufacture of new magnets as raw materials in the synthesis of metals, then precursor alloys.

A 3rd known recycling route is the so-called «powder» route during which the recovered magnets (for example from unusable appliances) are reduced to powder form. These powders are then diluted in polymers to make bonded magnets or they are densified by heat treatments to obtain sintered magnets.

The so-called «powder» route has the advantage of being able to readjust the compositions of the new magnets made from recycled magnets by mixtures of different powders and thus of having a certain freedom as to the final shape of these new magnets. Furthermore, in the case of sintered magnets, this recycling route is based on magnet production methods by powder metallurgy which are already implemented and perfectly mastered.

Moreover, this so-called «powder» recycling route (just like the so-called «direct» route) does not allow optimal use of the heavy rare earths (Dy or Tb) which are present in the magnetic phase of certain permanent magnets essentially replacing neodymium (as well as to a lesser extent praseodymium), in order to improve their coercivity and their resistance to temperature. For example, the Dy content can be up to 10% by mass on average for operating temperatures from 150 to 180° C. Indeed, the heavy rare earths make it possible to increase the magneto crystalline anisotropy of the magnetic phase and therefore the resistance to demagnetization.

In this context, it should be remembered that there are two categories of rare earth:

heavy rare earths comprising: europium (Eu), gadolimium (Gd), terbium (Tb), dysprosium (Dy), holmium (Ho), erbium (Er), thulium (Tm), ytterbium (Yb), lutetium (Lu) and yttrium (Y), light rare earths comprising: lanthanum (La), cerium (Ce), praseodymium (Pr), neodymium (Nd) and samarium (Sm).

It is known from the methods for manufacturing permanent magnets comprising heavy rare earths that the substitution of neodymium (as well as to a lesser extent of praseodymium) by heavy rare earths in the whole of the $TR_2Fe_{14}B$ magnetic phase is accompanied by a decrease in remanence which can be limited by using a mixture of a powder low in heavy rare earths and a powder rich in heavy rare earths or else by diffusing the heavy rare earths from the surface of the sintered magnets and along grain boundaries. In this way, the heavy rare earths are preferentially located at the periphery of the magnetic grains, that is to say in the most critical regions for demagnetization, so as to obtain a structure known under the name «core-shell». The peripheral region of a magnetic grain is therefore the region in which the heavy rare earths have diffused during the manufacture of the magnet.

In other words, knowledge of the methods for manufacturing magnets comprising heavy rare earths underlines the importance of locating the heavy rare earths in a peripheral region of the magnetic grains, in order to improve the gains in magnetic performance of magnets thus obtained while also having the advantage of limiting the quantity of heavy rare earths necessary for their manufacture.

Yet, during the so-called «powder» recycling method, it is possible to co-sinter several powders, at least one of which may have been obtained from recycled magnets which contained rare heavy earth. But in this case, a significant part of these heavy rare earths will not be able to diffuse outside the grains and will therefore remain in the magnetic phase of said powder rather than coming to feed a core-shell type effect at the periphery of the grains initially devoid of heavy rare earths. This is why, in order to obtain magnetic performances comparable to those obtained with manufacturing methods for permanent magnets comprising heavy rare earths from virgin raw materials, during this so-called «powder» recycling route, it is known to add heavy rare earths from primary sources (in other words deposits of heavy rare earths). Or, if one wishes to recycle magnets rich in heavy rare earths (typically a content greater than 2.5% by mass), it is also known to mix a first powder from these recycled magnets rich in heavy rare earths with a 2nd powder free of heavy rare earths or at least with a low content of heavy rare earths (typically a content of less than 1% by weight). The co-sintering of these 2 powders only makes it possible to diffuse a small part of the heavy rare earths contained in the 1st powder. With such a mixture of powders, the increase in coercivity is in the range of 150 kA/m per percentage of added heavy rare earth.

The inventors of the present invention have sought to optimize the use of the heavy rare earths present in the permanent magnets recycled during the so-called «powder» recycling method.

The inventors have thus sought to improve the so-called «powder» recycling route by proposing a new method for manufacturing a magnet from recycled permanent magnets of the TRFeB type and containing heavy rare earths which is based on this recycling route but which also has other original technical characteristics which are detailed below allowing:

- obtaining magnets with high magnetic performance (namely good coercivity while maintaining high remanence), without any addition of heavy rare earths from virgin raw materials (for example from deposits); which minimizes environmental impacts and is more energy efficient;
- optimal recovery of permanent magnets with high levels of heavy rare earths (for example between 2.5 and 10% by mass) from unusable appliances or devices (in other words magnets to be recycled);
- the use of current production lines for the manufacture of magnets.

The method for manufacturing a magnet from recycled magnets is based on the so-called «powder» recycling route and makes it possible to obtain a magnet in which the heavy rare earths are located at the periphery of the grains of the magnetic phase, in order to obtain good coercivity while maintaining high remanence, and even optimizing its magnetic performance compared to that of recycled magnets containing said heavy rare earths.

The invention relates to a method for manufacturing a magnet from recycled magnets which comprises at least the following steps of:

a) providing:

- a 1st powder comprising grains of a magnetic phase $TR_2Fe_{14}B$, metal-based compounds and a grain boundary phase rich in rare earth, and optionally grains of a non-magnetic phase $TRFe_4B_4$, said 1st powder being free of heavy rare earth or the mass content of heavy rare earth expressed in relation to the mass of the 1 st powder not exceeding 3%, preferably 1%,
- a 2nd powder obtained from recycled magnets comprising heavy rare earths, the mass content of heavy rare earths, expressed relative to the mass of said 2nd powder being comprised between 3% and 10%, preferably between 5% and 10%, said 2nd powder containing grains of a $TR_2Fe_{14}B$ magnetic phase, b) subjecting the 2nd powder to a hydrogenation-disproportionation treatment so as to decompose the magnetic phase $TR_2Fe_{14}B$ into a mixture containing rare earth hydrides of chemical formula $TRH_x$ in which x is the atomic ratio of H/TR and is for example between 2 and 3, iron and iron boride ($Fe_2B$), c) mixing the 1st powder with the 2nd powder obtained at the end of step b) in a mass ratio which depends on the heavy rare earth content of the 2nd powder so as to obtain a mixture, d) subjecting the mixture obtained at the end of step c) to a compacting step so as to obtain a compacted part, e) subjecting the compacted part obtained at the end of step d) to a sintering step so as to obtain a magnet.

Because the 2nd powder contains heavy rare earths, during step b) of the manufacturing method according to the invention, heavy rare earth hydrides are formed. The mass ratio of step c) can be determined as follows: for example if the 2nd powder contains X % of heavy rare earths and it is desired to achieve an overall content of Y % in the final magnet, the mass ratio of the mass m2 of the 2nd powder on the mass m1 of the 1st powder is $m2/m1=Y/(X-Y)$.

During step e) of sintering the mixture of the 1st and 2nd powders, a liquid phase is formed (by eutectic reaction) between the various metal-based compounds, the TR-rich phase, the magnetic phase $TR_2Fe_{14}B$ and the optional non-magnetic phase $TRFe_4B_4$ of the 1st powder. This liquid phase has a high mass content of rare earths, in the range of 90% by mass at 700° C., 80% at 900° C. and 70% at 1000° C. During the temperature rise under vacuum, the rare earth hydrides formed in step b), in particular the heavy rare earth hydrides are transformed into metallic heavy rare earths which dissolve in the said liquid phase so as to enrich it. These heavy rare earths now in the form of metallic heavy rare earths are then available to create a so-called «core-shell» structure as mentioned above around the grains of the 1st powder during the densification of the 1st and 2nd powders which occurs during sintering.

Thus, thanks to step b) of the manufacturing method according to the invention, the heavy rare earths present in the recycled magnets are extracted from the magnetic phase by being transformed into hydrides. This increases the chemical activity of heavy rare earths. Indeed, during the rise in temperature under vacuum during sintering, the transformation of these hydrides into metallic heavy rare earths 30 makes them available in the liquid phase which is also formed during sintering.

Step b) of the manufacturing method according to the invention thus makes it possible to dispense with a step of diffusion of these heavy rare earths within the grains of the $TR_2Fe_{14}B$ magnetic phase of the 2nd powder; which is a slow process and which would create a concentration gradient within the grains rich in heavy rare earths of the 2nd powder. This would make it possible to ultimately valorize only a small fraction of the quantity of said heavy rare earths. Moreover, in this case of diffusion, the content of heavy rare earths at the periphery of the grains of the 1st powder would be lower than the content of heavy rare earths in the grains of the 2nd powder.

Conversely, with the manufacturing method according to the invention, the extraction of heavy rare earths from the magnetic phase of the recycled magnets of the 2nd powder increases their chemical potential. At the end of step e), the heavy rare earths are located at the periphery of the grains of the magnetic phase $TR_2Fe_{14}B$ of the 1st powder at higher contents than the content of heavy rare earths in the grains of the 2nd powder obtained from recycled magnets, so that the coercivity of the magnet thus obtained is increased very significantly, and this while said magnet contains small amounts of heavy rare earths.

Furthermore, the manufacturing method according to the invention has the advantage of co-sintering the 1st and 2nd powders at a lower temperature, because the heavy rare earths have already been extracted from the grains of the $TR_2Fe_{14}B$ magnetic phase of the 2nd powder. It thus makes it possible to locate the heavy rare earths at the extreme periphery of the grains of the 1st powder and therefore to obtain a very marked «core-shell» structure which makes it possible to approach gains in coercivity from those obtained by diffusion at the grain boundaries in magnets 2 mm thick, namely an increase in the range of 200 to 300 kA/m for an addition of heavy rare earth of approximately 0.1% by mass, in a powder which does not contain it.

Thus, in the case of a mixture of so-called «classic» powders (namely without recycled magnets), and with a gain in the range of 150 kA/m for 1% by mass of heavy rare earth, to increase the coercivity by 300 kA/m it is generally necessary to provide, by the rich-heavy rare earths powder, 2% by mass of heavy rare earths. In the case of the manufacturing method according to the invention, the increase in coercivity can be in the range of 200 kA/m for 0.1% of heavy rare earths added and therefore in this case it would be necessary to provide globally only 0.15% by mass of heavy rare earths by the powder rich in heavy rare earths. It is then possible to achieve the same increase in coercivity with a strong dilution of the powder comprising recycled magnets, typically in a 1:10 ratio.

This gain in terms of dilution of the manufacturing method according to the invention is particularly interesting, because it makes it possible to envisage the recycling, in the short route, of quantities of recycled magnets rich in heavy rare earths, which will remain limited and to make it possible to manufacture large quantities of magnetically efficient magnets with a minimum of input of critical raw materials.

The various technical characteristics of the manufacturing method according to the invention are described below in more detail.

In the context of the present invention, the term «TR-rich grain boundary phase» means a metallic phase containing more than 70% by mass of rare earth combined with metals, for example metals selected from iron, copper and aluminum.

The metal-based compounds of the 1st powder can comprise metals selected from iron, copper, aluminum, gallium, titanium and zirconium.

The 1st powder may comprise in mass percentages expressed relative to the mass of said 1st powder:

between 90% and 99%, preferably between 95% and 97%, of grains of the $TR_2Fe_{14}B$ type magnetic phase,
between 0.5% and 3%, preferably between 0.5% and 2%, of the metals-based compounds,
between 1% and 10%, preferably between 2% and 5%, of the grain boundary phase rich in rare earth,
optionally between 0.1% and 5%, preferably between 0.1% and 1%, of grains of the non-magnetic phase of $TRFe_4B_4$ type.

The 1st powder may comprise, in mass percentages expressed relative to the mass of said 1st powder:
-between 27% and 35% rare earth,
between 0.9% and 1.2% boron, 100% complement of at least one metallic element M selected from the group consisting of Fe, Co, Ni, taken alone or as a mixture thereof, the sum of the mass percentages of Ni and Co being less than or equal to 5%, and optionally Fe being partially replaced by at least one replacement element selected from the group consisting of Al, Cu, Ga, Nb, Zr, Ti, Mo, V, Hf, Ta, W, Sn, taken alone or as a mixture of these, the content of the replacement element(s) being less than or equal to 3%.

The 1st powder preferably has a particle size comprised between 3 μm and 7 μm.

The 1st powder may have been obtained from:
virgin raw materials (for example pure metals and/or alloys), or
recycled magnets which are completely free of heavy rare earths or whose mass content does not exceed 3%, preferably 1%, or else
a mixture of virgin raw materials and recycled magnets which are totally free of heavy rare earths or whose mass content does not exceed 3%, preferably 1%.

When the 1st powder has been obtained totally or partly from virgin raw materials, the latter are selected from pure metals and/or alloys. Preferably, they are pure metals.

When the 1st powder has been obtained totally or partly from virgin materials, the latter may have been subjected to the following steps:
a wheel casting step, followed by
a step of decrepitation under hydrogen and/or air jet milling (also known as Jet Mill type).

First of all, the mixture of virgin raw materials (in other words the «base load») is heated, preferably under partial pressure of inert gas or else under vacuum, to a temperature advantageously between 1350° C. and 1550° C., so as to obtain a bath of molten material.

The bath of molten material is then cast on a cooled rotating wheel. The molten material is thus solidified by quenching. The cooling rate can be comprised between 100 K/s and 1000 K/s. The obtained molten ribbons can have a thickness comprised between 0.1 and 0.5 mm, preferably between 0.15 and 0.35 mm.

The decrepitation step under hydrogen makes it possible to obtain a first powder whose particle size is comprised between 50 μm and a few millimeters.

The decrepitation under hydrogen can be carried out at a temperature comprised between 10° C. and 500° C., preferably between 20° C. and 150° C., and at a hydrogen pressure comprised between 0 MPa and 5 MPa, preferably between 0.08 MPa and 0.25 MPa.

The duration of the hydrogen decrepitation step can be comprised between 1 hour and 5 hours.

The air jet milling step makes it possible to obtain a 1st powder whose median size is comprised between 2 μm and 10 μm, preferably between 3 μm and 6 μm, with a particle size fineness whose ratio of 9th decile to 1st decile, or in other words «D90/D10», is less than 10, preferably less than 5. Commercial equipment such as mills marketed by the Hosokawa-Alpine company under the trade names AFG100, AFG200 and AFG400 can be used for this air jet milling step. They have a sealed chamber into which an inert gas under a pressure comprised between 2 and 8 bars is introduced through three converging nozzles, and the powder to be milled through a hopper to control the supply rate. The gas flow carries the powder in its wake and releases it by passing in a whirlpool generated by a system called «cyclone». In order to improve the particle size fineness, this equipment can be equipped with an inertial selector which prevents the largest particles from leaving the milling chamber.

When the 1st powder has been totally or partly obtained from recycled magnets, the latter may have been subjected to a decrepitation step under hydrogen and/or air jet milling.

The technical characteristics of the hydrogen decrepitation and air jet milling step may be those which have been described for obtaining the 1st powder from virgin raw materials.

The 2nd powder preferably has a particle size comparable to that of the first powder so as to facilitate the mixing of the 1st powder with the 2nd powder in step c) of the manufacturing method according to the invention. The 2nd powder preferably has a particle size between 3 μm and 7 μm.

The 2nd powder may comprise, in mass percentages expressed relative to the mass of said 2nd powder:

between 27% and 35% of rare earth, of which between 3% and 10%, preferably between 5% and 10%, of heavy rare earth, between 0.9% and 1.2% boron, 100% complement of at least one metallic element M selected from the group consisting of Fe, Co, Ni, taken alone or as a mixture thereof, the sum of the mass percentages of Ni and Co being less than or equal to 5% and, optionally Fe being partially replaced by at least one replacement element selected from the group consisting of Al, Cu, Ga, Nb, Zr, Ti, Mo, V, Hf, Ta, W, Sn, taken alone or as a mixture of these, the content of the replacement element(s) being less than or equal to 3%.

Advantageously, the 2nd powder was obtained from recycled magnets which were subjected to the following treatment:

a decrepitation step under hydrogen, optionally followed by an air jet milling.

The decrepitation step under hydrogen makes it possible to obtain a second coarse powder whose particle size is comprised between 50 μm and a few millimeters.

The technical characteristics of the decrepitation step under hydrogen and air jet milling for obtaining the 2nd powder can be those which have been described for obtaining the 1st powder from virgin raw materials or recycled magnets.

The hydrogenation-disproportionation treatment can be carried out under vacuum, namely by heating the 2nd powder under vacuum to a high temperature before the introduction of hydrogen. In another embodiment of the invention, the 2nd powder is heated to an elevated temperature after the introduction of hydrogen.

The term «high temperature» means a temperature comprised between 800° C. and 1200° C., namely the temperature to which the 2nd powder is subjected during the hydrogenation-disproportionation treatment.

The 2nd powder can be heated until the high temperature is obtained with a heating rate comprised between 1° C./minute and 30° C./minute.

The hydrogen pressure during the hydrogenation-disproportionation treatment can be comprised between 0.01 bar and 50 bar, preferably between 0.8 bar and 5 bar.

The duration of the hydrogenation-disproportionation treatment can be comprised between 2 hours and 10 hours.

At the end of the hydrogenation-disproportionation treatment, the 2nd powder can be subjected to cooling under hydrogen, in order to prevent the recombination of the elements to reform the magnetic phase $TR_2Fe_{14}B$, and therefore to preserve the mixture of hydrides of rare earths of chemical formula $TRH_x$, iron and iron boride ($Fe_2B$), up to room temperature (namely approximately 20° C.).

Optionally, before performing step c) of the manufacturing method according to the invention, the 2nd powder is fractured in order to improve the contact between the rare earth hydrides and the liquid phase during step e) so that the metallic heavy rare earths dissolve better in the liquid phase. This step may be necessary if the grains of the 2nd powder have re-agglomerated during the hydrogenation-disproportionation treatment, but also if their microstructure is not the most suitable, namely in particular if the hydrides are located within the grains rather than on the periphery. The 2nd powder may have been fractured by at least one milling technique selected from the air jet milling, planetary milling and attrition milling.

Step c) of mixing the 1st powder and the 2nd powder obtained at the end of step b) is advantageously carried out for at least 30 minutes, preferably more than one hour, so as to obtain a homogeneous mixture.

The mixture obtained at the end of step c) can be poured into a mold (having the negative shape of the magnet to be manufactured) to carry out compacting step d).

The compacting step can be carried out using transverse, axial, cold isostatic compaction or isostatic pressing with rubber (also known under the name «RIP», for «Rubber Isostatic Pressing»), so as to obtain a compacted part called «green part». For example, the mixture is compacted by applying a uniaxial pressure comprised between 50 MPa and 300 MPa.

The density of the compacted part obtained at the end of step d) is advantageously comprised between 50% and 70% of the theoretical density of said mixture obtained at the end of step c).

In an advantageous embodiment of the invention, at the end of step c) and before carrying out compacting step d), the mixture obtained at the end of step c) is subjected to a magnetic field to orient the grains of the mixture and ultimately obtain an anisotropic magnet which has a high remanence. Preferably, the magnetic field is greater than 1 Tesla, more preferably greater than 2 Tesla. This application of the magnetic field can be carried out when the mixture obtained at the end of step c) has been poured into the mold.

In an advantageous embodiment of the invention, at the end of step d) and before carrying out step e) of sintering, the compacted part obtained at the end of step d) is dehydrated. This operation consists in eliminating almost all of the hydrogen contained in the compacted part. The hydrogen is essentially present in the form of NdHx hydrides with x close to 2. The aim is to reduce the overall hydrogen content in the compacted part, which is for example in the range of 2000 ppm (0.2% by mass) to a value for example less than 100 ppm (0.01% by mass), preferably less than 50 ppm (0.005% by mass). This operation makes it possible to obtain better magnetic properties after sintering.

This optional step of dehydrating the compacted part can be carried out by subjecting said compacted part to a temperature comprised between 600° C. and 800° C., preferably under a high vacuum so as to avoid the demixing of the TRFeB phase, and this in the presence of hydrogen. A secondary vacuum corresponds to a pressure lower than $10^{-4}$ mbar, preferably lower than $5.10^{-5}$ mbar.

Next, step e) of sintering is carried out so as to obtain a magnet. This is the consolidation by heat treatment of the compacted part, possibly with a fusion, partial or total, of some of its constituents (but not of all its constituents, so that the compacted part is not transformed into a liquid mass).

Step e) of sintering is advantageously carried out in an environment substantially containing no oxygen, water or hydrogen, preferably under secondary vacuum and at a temperature comprised between 850° C. and 1050° C. C and for a period comprised between 3 hours and 24 hours so as to obtain said magnet.

At the end of step e) of the manufacturing method according to the invention, a magnet is obtained whose density is advantageously greater than 98% of the theoretical density of the material which constitutes it.

In an advantageous embodiment of the invention, at the end of step e), the magnet thus obtained is subjected to cooling. Preferably, it is a rapid cooling, namely greater than 20° C./min, more preferably about 30° C./min, from the sintering temperature to room temperature or, where appropriate to the temperature at the start of the optional annealing step described below.

The magnet obtained at the end of step e), if necessary after cooling if this is implemented, can then be subjected to an annealing step.

Indeed, annealing makes it possible to increase the resistance to demagnetization of the magnet. A person skilled in the art masters the conditions for carrying out the annealing step.

For example, if the magnet has been subjected to rapid cooling to a temperature of 50° C., the annealing step may comprise the following thermal profile:

a heating from 50° C. to 820° C. at 5° C./min;
a temperature level at 820° C. for 2 hours;
a cooling from 820° C. to 50° C. at 20° C./min;
a heating from 50° C. to a temperature comprised between 460° C. and 650° C. at 5° C./min;
a temperature level at a temperature comprised between 460° C. and 650° C. for 2 hours;
cooling from the temperature comprised between 460° C. and 650° C. to 50° C. at 30° C./min.

In an advantageous embodiment of the invention, at the end of step e) of sintering, if necessary at the end of cooling if this is implemented or of the step of annealing if this is implemented, the magnet can be machined and/or undergo a surface treatment, for example a polishing or the application of a coating to prevent oxidation and corrosion.

At the end of the manufacturing method described above, a magnet does not have its own magnetization. The magnet can thus be subjected to a complementary magnetization: for example, the magnet can be subjected to a magnetization field parallel to the direction of alignment of the magnetic field used to orient the grains of the mixture and to obtain an anisotropic magnet like described above. The magnetic field may have an intensity greater than 4 Tesla, preferably greater than 5 Tesla. These high values are generally obtained in pulsed mode.

In other words, at the end of step e) of sintering, the magnet thus obtained can be subjected to at least one of the following steps (namely one of these steps or any combination thereof) selected from:

a cooling, for example a cooling step as described above;
an annealing step, for example an annealing step as described above;
a machining and/or surface treatment step, for example a machining and/or surface treatment step as described above;
an additional magnetization step, for example an additional magnetization step as described above.

These optional steps carried out after step e) of sintering are perfectly within the reach of those skilled in the art.

The present invention will be better understood using the detailed description of the experimental part below which describes, by way of non-limiting example, one embodiment of the method for manufacturing a magnet according to the invention.

EXPERIMENTAL PART

Preparation of the 1st Powder

A 1st powder comprising in mass percentages expressed relative to the mass of said 1st powder:

34.4% of a mixture of the two rare earths Nd and Pr (according to the following mass percentages: 75% of Nd and 25% of Pr, these mass percentages being expressed relative to the total mass of said two rare earths);
B: 0.96%; Co: 0.5%; Al: 0.3%; Cu: 0.18%; Ga: 0.15%; Ti: 0.08%.
Fe: 100% complement,
was prepared as follows.

Initially, virgin raw materials were available in bulk form of the various metals as detailed above and, in the quantities, also indicated above (in other words the «base load»).

This basic load was heated. The fusion was carried out under partial pressure of argon (400 mbar) in an alumina crucible at a maximum temperature of 1450° C. so as to obtain a fusion bath.

The bath of molten material was cast on a water-cooled copper-based wheel and having a rotation speed allowing crystallized ribbons to be obtained with a thickness comprised between 0.15 mm and 0.40 mm.

The ribbons thus obtained were collected in a tank cooled by water circulation so as to cool them to room temperature.

The ribbons were then placed in a sealed enclosure of an oven for a decrepitation step.

The decrepitation step was carried out as follows. The enclosure was placed under primary vacuum (namely a pressure of less than 1 mbar, preferably less than 10-2 mbar), then filled with hydrogen to reach a pressure of 2 bars. Then, the enclosure was placed under primary vacuum to evacuate the hydrogen, then it was heated to a temperature of 550° C. for 2 hours to obtain partial dehydration, then cooled to ambient temperature (namely approximately 20° C.) under argon.

The coarse powder thus obtained was then homogenized in a mixer into which 0.05% by mass of zinc stearate had been introduced, the mass percentage of zinc stearate being expressed relative to the mass of said coarse powder. Zinc stearate is a lubricant that facilitates the establishment of a fluidized bed during the gas jet milling step (jet mill). This homogenization lasted 1 hour and a half.

The homogenized powder thus obtained was then introduced into a fluidized bed gas jet mill. The used gas was nitrogen. The milling pressure, nozzle diameter and selector speed were adjusted to obtain a first powder whose median particle size measured online by a laser particle sizer was 5 μm.

Preparation of the 2nd Powder

A 2nd powder comprising in mass percentages expressed relative to the mass of said 2nd powder:

28.9% of a mixture of the two rare earths Nd and Pr (according to the following mass percentages: 75% of Nd and 25% of Pr, these mass percentages being expressed relative to the total mass of said two rare earths);
Dy: 3.2%;
B: 0.96%; Co: 1.0%; Al: 0.9%; Cu: 0.15%; Ga: 0.02%; Ti: 0.07%; Nb: 0.1%.

Fe: 100% complement, was prepared as follows.

Initially, recycled magnets of dimensions 8×28×5 mm were available which comprised the various metals as detailed above and, in the quantities, also indicated above.

The recycled magnets were placed in a sealed enclosure of an oven for the decrepitation step. The enclosure was placed under primary vacuum, then filled with hydrogen to reach a pressure of 2.5 bars. This treatment made it possible to hydride the entire material but also to peel off the metallic coatings. The enclosure was placed under primary vacuum to evacuate the hydrogen, then it was heated to a temperature of 550° C. for 2 hours for partial dehydration, then cooled to room temperature under argon.

The coarse powder thus obtained was sieved at 1000 μm to eliminate the peelings of the metal coatings. The sieved powder thus obtained was then homogenized in a mixer into which 0.05% by mass of zinc stearate had been introduced, the mass percentage of zinc stearate being expressed relative to the mass of said coarse powder. This homogenization lasted 1 hour and a half.

The homogenized powder thus obtained was then introduced into a fluidized bed gas jet mill. The used gas was nitrogen. The milling pressure, the diameter of the nozzles and the selector speed were adjusted to obtain a 2nd powder whose median particle size measured online by a laser particle sizer was 5 μm.

A 1st powder and a 2nd powder were thus available in accordance with step a) of the manufacturing method according to the invention.

During step b) of hydrogenation-disproportionation treatment of the manufacturing method according to the invention, the 2nd powder was subjected to an environment of pure hydrogen at an absolute pressure of 0.8 bar in a sealed enclosure of an oven at room temperature.

Then, the oven was heated to a temperature of 850° C., for a period of 3 hours, to allow the complete reaction of said 2nd powder with hydrogen and to transform it into a mixture consisting essentially of the Fe, $Fe_2B$, FeB, $TRH_x$ phases. These phases formed inside the grains of said 2nd powder. The objective was to obtain a fairly coarse microstructure with the sub-grains of the $TRH_x$ hydride phases emerging at the periphery of the grains.

Then, according to step c) of the manufacturing method, the 1st powder was mixed with the 2nd powder obtained at the end of step b) in a mass ratio which depends on the heavy TR content of the 2nd powder for 30 minutes in a mixer, in a chamber under a controlled atmosphere.

The mass ratio of the mass m2 of the 2nd powder to the mass m1 of the 1st powder was equal to m2/m1=10/90.

The mixture obtained at the end of step c) was then introduced into various cylindrical molds of 22 mm in height and 14 mm in internal diameter in rubber which were subjected to a magnetic field of 7 Tesla to orient the particles.

Next, step d) of compacting the manufacturing method according to the invention was carried out by subjecting the mixture contained in these various molds to cold isostatic compaction at 1500 bar so as to obtain compacted parts.

Then, step e) of sintering the manufacturing method according to the invention was carried out on these parts compacted under secondary vacuum according to the following thermal profile:

heating at 5° C./min from ambient temperature to 300° C., then a temperature level for 2 hours at 300° C., heating at 5° C./min from 300° C. to 500° C., then a temperature level for 2 hours at 500° C., heating at 5° C./min from 500° C. to 750° C., then a temperature level for 2 hours at 750° C., heating at 1° C./min from 750° C. to 975° C., then a temperature level for 12 hours at 975° C.

At the end of the last temperature level (sintering), argon was introduced until an absolute pressure of 2 bar was reached so as to obtain magnets.

Next, the magnets were subjected to cooling with a cooling rate of 15° C./min from 975° C. down to 30° C.

Then, the magnets were then subjected to an annealing step under secondary vacuum according to the following thermal profile:

heating at 5° C./min from 50° C. to 820° C., a temperature level at 820° C. for 2 hours, cooling at 20° C./min from 820° C. to 50° C., heating at 5° C./min from 50° C. to 500° C., a temperature level at a temperature of 500° C. for 2 hours, cooling at 15° C./min from 500° C. to ambient temperature.

The cylindrical magnets thus obtained were machined using a milling machine and a diamond wheel to remove the oxide layer and obtain parallel surfaces.

The magnetic performances of the magnets thus obtained were as follows: coercivity HcJ=1533 kA/m, remanence Br=1.2 T and maximum energy product (BH) max=34.7 MGOe.

The invention claimed is:

1. A method for manufacturing a magnet from recycled magnets, wherein it comprises at least the following steps of:

a) providing:

a 1st powder comprising grains of a magnetic phase $TR_2Fe_{14}B$ (wherein «TR» designates an element or a combination of two or more elements selected from the rare earths), metal-based compounds and a grain boundary phase consisting of a metallic phase containing more than 70% by mass of rare earth combined with metals, and optionally grains of a non-magnetic phase $TRFe_4B_4$, said 1st powder being free of heavy rare earth or the mass content of heavy rare earth expressed in relation to the mass of the 1st powder not exceeding 3%, a 2nd powder obtained from recycled magnets comprising heavy rare earths, the mass content of heavy rare earths, expressed relative to the mass of said 2nd powder being comprised between 3% and 10%, said 2nd powder containing grains of a $TR_2Fe_{14}B$ magnetic phase, b) subjecting the 2nd powder to a hydrogenation-disproportionation treatment so as to decompose the magnetic phase $TR_2Fe_{14}B$ into a mixture containing rare earth hydrides of chemical formula $TRH_x$ in which x is the atomic ratio of H/TR, iron and iron boride ($Fe_2B$), c) mixing the 1st powder with the 2nd powder obtained at the end of step b) in a mass ratio which depends on the heavy rare earth content of the 2nd powder so as to obtain a mixture, d) subjecting the mixture obtained at the end of step c) to a compacting step so as to obtain a compacted part, e) subjecting the compacted part obtained at the end of step d) to a sintering step so as to obtain a magnet.

2. The manufacturing method according to claim 1, wherein the 1st powder comprises, in mass percentages expressed relative to the mass of said 1st powder:

between 90% and 99%, of grains of the $TR_2Fe_{14}B$ magnetic phase, between 0.5% and 3%, of the metals-based compounds, between 1% and 10%, of the grain boundary phase consisting of a metallic phase containing more than 70% by mass of rare earth combined with metals, optionally between 0.1% and 5%, of grains of the non-magnetic phase $TRFe_4B_4$.

3. The manufacturing method according to claim 1, wherein the 1st powder comprises, in mass percentages expressed with respect to the mass of said 1st powder:

between 27% and 35% rare earth, between 0.9% and 1.2% boron, balance to 100% consisting of at least one metallic element M selected from the group consisting of Fe, Co, Ni, taken alone or as a mixture thereof, the sum of the mass percentages of Ni and Co being less than or equal to 5%, and optionally Fe being partially replaced by at least one replacement element selected from the group consisting of Al, Cu, Ga, Nb, Zr, Ti, Mo, V, Hf, Ta, W, Sn, taken alone or as a mixture of these, the content of the replacement element(s) being less than or equal to 3%.

4. The manufacturing method according to claim 1, wherein the 2nd powder comprises, in mass percentages expressed with respect to the mass of said 2nd powder:

between 27% and 35% of rare earth, of which between 3% and 10%, of heavy rare earth, between 0.9% and 1.2% boron, balance to 100% consisting of at least one metallic element M selected from the group consisting of Fe, Co, Ni, taken alone or as a mixture thereof, the sum of the mass percentages of Ni and Co being less than or equal to 5% and, optionally Fe being partially replaced by at least one replacement element selected from the group consisting of Al, Cu, Ga, Nb, Zr, Ti, Mo, V, Hf, Ta, W, Sn, taken alone or as a mixture of these, the content of the replacement element(s) being less than or equal to 3%.

5. The manufacturing method according to claim 1, wherein the 1st powder was obtained from:

virgin raw materials, or recycled magnets which are completely free of heavy rare earths or whose mass content does not exceed 3%, or a mixture of virgin raw materials and recycled magnets which are totally free of heavy rare earths or whose mass content does not exceed 3%.

6. The manufacturing method according to claim 5, wherein the virgin raw materials have been subjected to the following steps:

a wheel casting step, followed by a step of decrepitation under hydrogen and/or air jet milling.

7. The manufacturing method according to claim 5, wherein the recycled magnets have been subjected to a step of decrepitation under hydrogen and/or air jet milling.

8. The manufacturing method according to claim 1, wherein the 2nd powder has been obtained from recycled magnets which have been subjected to the following treatment:

a step of decrepitation under hydrogen, optionally followed by an air jet milling.

9. The manufacturing method according to claim 1, wherein the 2nd powder has been fractured by at least one milling technique selected from air jet milling, planetary milling and attrition milling.

10. The manufacturing method according to claim 1, wherein at the end of step c) and before carrying out step d) of compacting, the mixture obtained at the end of step c) is subjected to a magnetic field.

11. The manufacturing method according to claim 1, wherein at the end of step d) and before carrying out step e) of sintering, the compacted part obtained at the end of step d) is subjected to a hydrogen removal process.

12. The manufacturing method according to claim 1, wherein the magnet obtained at the end of step e) of sintering is subjected to at least one of the steps selected from a cooling, an annealing step, a machining and/or surface treatment step and an additional magnetization step.

\* \* \* \* \*